(12) United States Patent
Ewald et al.

(10) Patent No.: US 11,173,632 B2
(45) Date of Patent: Nov. 16, 2021

(54) MULTI-COMPONENT MIXING AND METERING EQUIPMENT WITH ONLINE STOICHIOMETRY CONTROL

(71) Applicant: Hexion Inc., Columbus, OH (US)

(72) Inventors: Dirk Ewald, Ottignies Louvain-la-Neuve (BE); Anna Tihaya, Ottignies Louvain-la-Neuve (BE); Tareq Hasson, Ottignies Louvain-la-Neuve (BE); Nicole Megger, Ottignies Louvain-la-Neuve (BE); Sven Eichholz, Ottignies Louvain-la-Neuve (BE); Isabella Mazurczyk, Ottignies Louvain-la-Neuve (BE)

(73) Assignee: HEXION INC., Columbus, OH (US)

(*) Notice: Subject to any disclaimer, the term of this patent is extended or adjusted under 35 U.S.C. 154(b) by 0 days.

(21) Appl. No.: 16/476,850

(22) PCT Filed: Aug. 30, 2018

(86) PCT No.: PCT/EP2018/000423
§ 371 (c)(1),
(2) Date: Jul. 9, 2019

(87) PCT Pub. No.: WO2019/042583
PCT Pub. Date: Mar. 7, 2019

(65) Prior Publication Data
US 2019/0351582 A1 Nov. 21, 2019

(51) Int. Cl.
*B29B 7/72* (2006.01)
*B29B 7/60* (2006.01)
*C08G 59/18* (2006.01)
*G05D 11/13* (2006.01)
*B29B 7/74* (2006.01)

(52) U.S. Cl.
CPC .............. *B29B 7/726* (2013.01); *B29B 7/603* (2013.01); *B29B 7/7471* (2013.01); *C08G 59/18* (2013.01); *G05D 11/131* (2013.01)

(58) Field of Classification Search
CPC .......... B29B 7/603; B29B 7/726; C08G 59/18
See application file for complete search history.

(56) References Cited

U.S. PATENT DOCUMENTS

| | | | |
|---|---|---|---|
| 5,382,394 A * | 1/1995 | Terhardt | B29C 31/063 264/102 |
| 5,670,203 A | 9/1997 | Terhardt et al. | |
| 6,050,283 A | 4/2000 | Hoffman et al. | |
| 6,517,230 B1 | 2/2003 | Afnan et al. | |

(Continued)

OTHER PUBLICATIONS

"Incorrect Mixing of Multi-Component Coatings" by Valerie Sherbondy posted on kta.com on May 15, 2014.*

(Continued)

*Primary Examiner* — Vu A Nguyen

(57) ABSTRACT

The invention describes an advanced mixing and metering technology with online analytics for a supply of formulated liquid thermosetting resins into an open or closed mold. The application addresses where a precise control of the composition of formulated components is required. Composite structures used in primary and secondary structural aerospace applications manufactured in Infusion or RTM processes are possible examples.

10 Claims, 2 Drawing Sheets

(56) References Cited

U.S. PATENT DOCUMENTS

| | | |
|---|---|---|
| 6,776,517 B2 | 8/2004 | Afnan et al. |
| 2011/0052379 A1* | 3/2011 | Link ................ B01F 15/00214 |
| | | 415/182.1 |
| 2013/0292863 A1 | 11/2013 | Shoemake et al. |
| 2016/0310365 A1 | 10/2016 | Boeckx et al. |
| 2017/0081487 A1 | 3/2017 | Smolka et al. |

OTHER PUBLICATIONS

MSDS of Bergolin 6D970-7038.*
MSDS of Bergolin 7D202.*

* cited by examiner

MULTI-COMPONENT MIXING AND METERING EQUIPMENT WITH ONLINE STOICHIOMETRY CONTROL

FIELD OF THE DISCLOSURE

The invention describes a concept of creating an advanced mixing and metering technology with online analytic tool for a supply of formulated liquid thermosetting resins into an open or closed mold.

BACKGROUND OF THE DISCLOSURE

High-performance fibers combined with thermoset resins offer very high strength-to-weight ratios and are ideal for making lightweight storage vessels, pressure vessels and other composite structures and articles. The concept addresses applications where a precise control of the composition of formulated components is required. Composite structures used in primary and secondary structural aerospace and automotive applications manufactured in Infusion, liquid Compression moulding (LLM) or RTM processes are possible examples.

Structural Aerospace components are one of the most critical and demanding applications with regards to quality in terms of precision and tolerances. Today, all resins are manufactured in batch processes, including precise off-line quality control of every batch with regards to determining the right quality and quantity of each ingredients and final product. Those applications are currently served by mono-component infusion resins (such as RTM6, Cycom 890 or EPS 600), supplied in packages of 5-10 kg. As most applications in the past decades only required feed of small volumes of formulated thermosetting materials (1-10 kg), this setup was seen as appropriate for this industry. Although, the supply chain is costly and complex, applications could still be realized using a mono-component system. However, considering the current towards manufacturing large scale product, this market requires moving from mono to bi-component resin systems, because of:

process safety and robustness
supply chain complexity and costs
new technological performance profiles not able to be realized in mono-component resin packages.

The current common practice is the usage of mono-component resin formulations in a packaging scale of 5-10 kg. Limiting the packaging size to 5-10 kg is required, since formulations are temperature instable, as they contain resin and curative. Transport and storage are limited by public authorities, depending on their individual classifications. EPIKOTE System 600, 3a current industry benchmark is classified as UN 3226 Class 4.1 Type D. This results in restriction of packaging to a maximum mass of 50 kg 10 kg, according to the German dangerous goods regulation (reference P520, OP7). Furthermore, indicated mono-component resin systems require cold storage and transport. The compositions change properties over time due to a chemical crosslinking between resin and curative. This results e.g. in a change (increase) of viscosity which is a critical performance characteristic during infusion. A viscosity below 200 mPas at injection temperature is considered as the upper limited of the processing window. As a consequence, products are stored today at $-18°$ C. or would consequently have a very limited shelf life.

Considering, the reactivity of those systems the preparation and refilling of the materials will create further quality and safety risks. In order to prepare large scale volumes a large number of small scale packages must be pre-heated and refilled. Today, materials are pre-heated to 60-80° C. in order to re-fill them. Considering the limited time t0 reach critical viscosity it is not possible to run an industrial process by refilling from small scale packaging.

To realize a move from mono to bi-component resin systems batch processes need to be substituted by introduction of static or dynamic mixers. The prior art gives some apparatus for supplying blends, such as in U.S. Pat. No. 5,382,394 or U.S. Pat. No. 5,670,203. However, this requires a precise online analysis of the mixture at any time of production in order to determine defects during production avoiding high-cost part refusal and performance related safety incidents during operation. State-of-the-art multi-component mixing and metering equipment create an opportunity to overcome those problems. The purpose of the mixing and metering device is to degas single components and combining them in a continuous process by e.g. a static mixer in a specific mass or volume fraction. This equipment can be placed "at site", in order to conduct the critical resin-curing agent formulation step right before infusion. However, this concept would require that the material composition is precisely known before it enters the mold for cure. As a consequence, the material must be permanently analyzed during preparation. Today, this on-site formulation is not possible since there is currently no industrial process available that offers the possibility to monitor the manufacturing process, particularly during the formulation process of the thermosetting materials online in a reliable manner. Although, an off-line analysis of the formulated products after infusion/injection would be possible to determine the quality (formulation) the lag in time would be too high to adjust the process if requirements on the formulation are not met. As a consequence, those parts would not meet the required preformance in mechanical, thermal and significant costs associated with a loss (out of specification) of a structural component would be tremendous.

SUMMARY OF THE DISCLOSURE

The implementation of an online analytical tool into state of the art multi-component mixing and metering (M&M) equipment implements a functionality that enables the user to operate the equipment in environments where precise monitoring and control of mass and volume ratios of different starting materials is required. An appropriate online measurement device can be IR, NIR, (but also refractive index or UV/VIS).

BRIEF DESCRIPTION OF THE DRAWINGS

For a further understanding of the nature and objects of the present invention, reference may be had to the following detailed description taken in conjunction with the accompanying figure, wherein.

DETAILED DESCRIPTION OF THE DISCLOSURE

Figure 1:
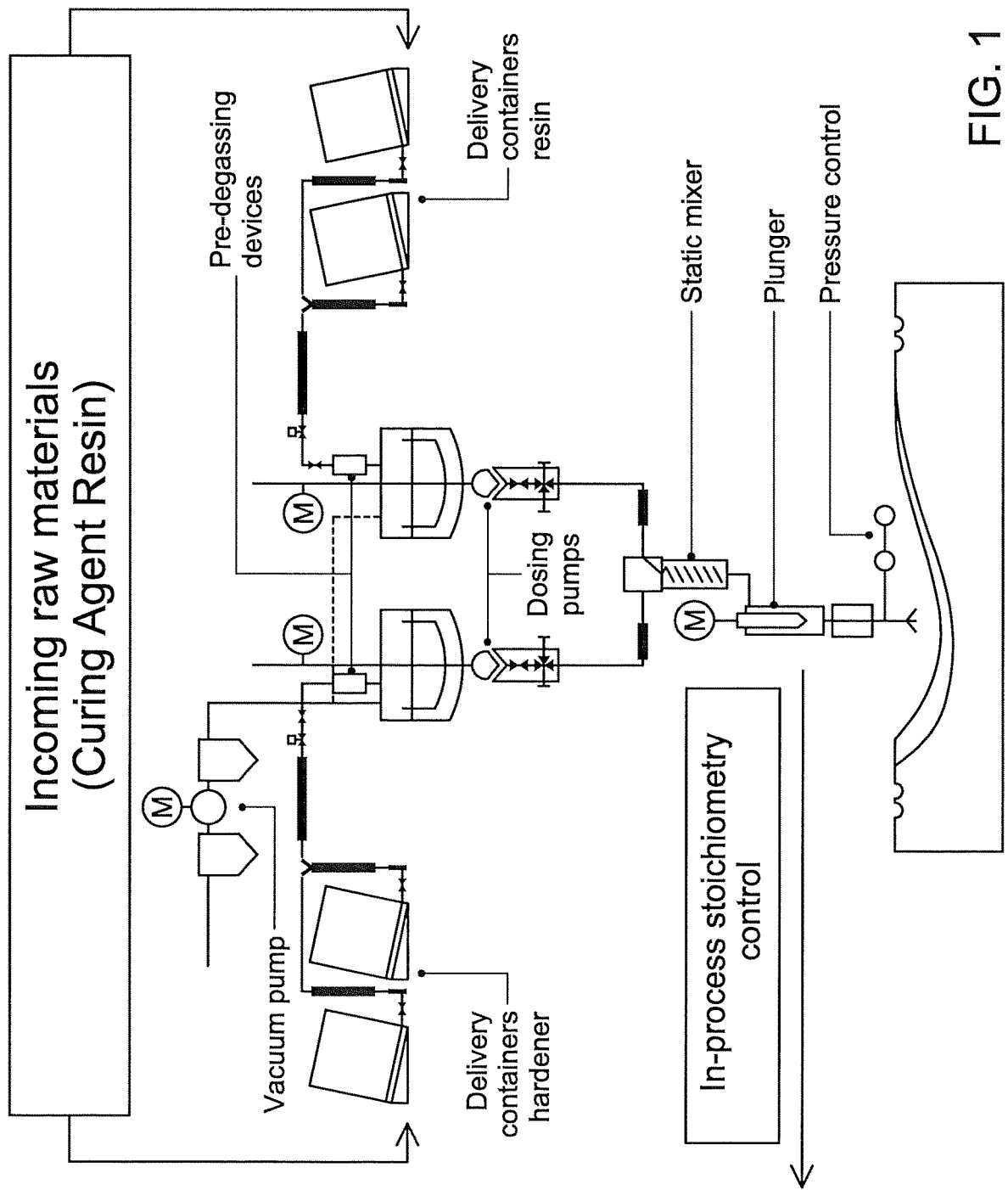
FIG. 1 is a schematic cross section of the flow process with the storage tanks, mixing zone and the analytical tool before the injection zone.

This invention describes a concept of creating an advanced mixing and metering technology with online analytic tool for a supply of formulated liquid thermosetting system into an open or closed mold. The thermosetting resin can be an epoxy resin, an isocyanate, a cyanate ester resin, a phenolic resin, an acid or hydroxyl functional resin, a bis-maleimide resin, an unsaturated resin. For the epoxy resins typical examples are the resins based on bis-phenol A, bis-phenol F, bis-phenol S, or glycidyl amine derivative (such as TGMDA, TGPAP, TGODA or TGDDS). The curing agent part of the thermosetting system is depending on the reactive chemical function of the thermosetting resin. For the epoxy resins the curing agent can be selected from amine derivatives such as for example aromatic polyfunctional amines, or cycloalphatic polyfunctional amines, or combinations thereof. Another class of curing agents for epoxy resins are acid derivatives such as anhydrides, or polyanhydrides, or polyfunctional acid component such as acid functional polyester or acrylic/methacrylic resins, epoxy resins typical examples are the resins based on bis-phenol A, bis-phenol F, bis-phenol S, or glycidyl amine derivative (such as TGMDA, TGPAP, TGODA or TGDDS). The curing agent part of the thermosetting system is depending on the reactive chemical function of the thermosetting resin. For the epoxy resins the curing agent can be selected from amine derivatives such as for example aromatic polyfunctional amines, or cycloalphatic polyfunctional amines, or combinations thereof. Another class of curing agents for epoxy resins are acid derivatives such as anhydrides, or polyanhydrides, or polyfunctional acid component such as acid functional polyester or acrylic/methacrylic resins.

The mass/volume fraction is set prior the process by the user. The process starts with developing an IR analytical model (IR, NIR, refractive index or UV/VIS) for a "set formulation", including allowed array for standard deviation. The model links the analytical measurement (IR spectrum, NIR spectrum, refractive index or UV absorbance) to the known concentration of resin or hardener in the sample. Several measurements at different known concentrations are used to set up a calibration line which is programmed in the analytical software. In addition to the calibration line, a target operating window is determined for the allowed analytical values. In the following a software model is built on basis of the specific starting materials used in the targeted formulation. During the mixing process, after the material leaves the mixing device (static or dynamic mixer) the material is analyzed online by the online measurement technique. The previously build model used to translate the analytical measurement (IR/NIR spectrum, refractive index value, UV absorbance) to the actual composition of the created formulation with "set formulation". The model compares "intensities" of prior selected absorptions of wavelengths of the actual formulation to the "intensities" of the "set formulation". If the analyzed composition is in the previously set window (in spec), the material is further is transferred into a mold by either pressure or vacuum. If the analyzed composition is not within the targeted range, the material is pumped into a second reservoir for waste or into an recycling chain that adds the specific mass fraction of the under-dosed component.

Two additional inline measurement probes can be installed in the raw material lines upstream of the static mixer. The continuous analysis of the raw materials yields the following possibilities:

If the analytical method is UV/VIS or refractive index, measurement of the raw materials will help predict the target window of the product. Minor changes in the raw material quality will be directly visible and the product analytical window may be adjusted accordingly. This will decrease the overall measurement error.

If the analytical method is NIR or IR, measurement of the raw materials can be used as continuous monitoring of the raw material quality. Appropriate models need to be built beforehand to link the measured spectra to key raw material quality parameters (e.g. viscosity, epoxy number).

The benefits of the invention are:

reduced costs during supply chain and storage since no −18° C. step is required anymore significant reduction of handling costs due to automated process improved safety, since no Cat. 4.1 materials are transported and stored improved safety, since refilling step of hot material (60-80° C.) can be abandoned improved quality due to lower thermal stress, since mixing step of material is in a range' of few seconds (residence time in static mixer) instead of hours in a batch process (residence time in batch reactor)

higher quality during infusion process since materials can be degassed at high vacuum and no refilling occurs quality monitoring enabling a significant reduction of goods that are out of specification.

EXAMPLES

The following examples and comparative examples are provided to illustrate certain embodiments of the invention.

Example 1

Determination of Mixing Ratio by Using IR InLine Analytic Tool.

Figure 2:
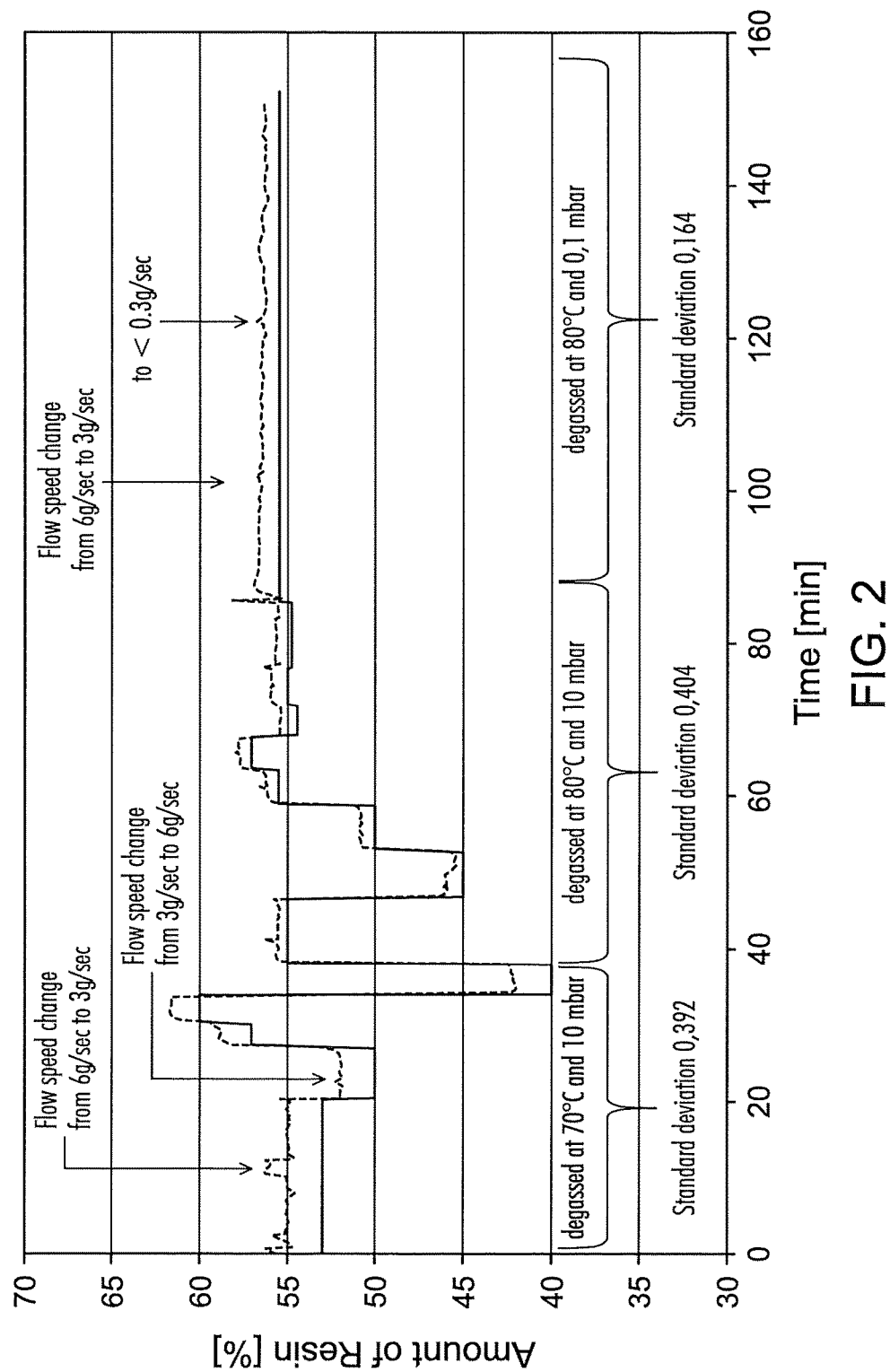
FIG. 2 is a graph illustrating the resin content in EPS600 measured by inline IR (dotted line), compared with the equipment setpoint values (solid line).

FIG. 2 shows the results of inline IR measurement during the test where the mixing ratios of the epoxy resin and the curing agent were changed on purpose. The set points of the resin settings are shown in red. The actual IR measurement is shown in blue. The accuracy of the measurement can only be assessed in combination with the accuracy of the equipment: during these tests the mixing unit itself was not calibrated separately.

From FIG. 2 it can be seen that the model is very sensitive to the composition of the samples: degassed samples, containing less volatiles (starting from 90 min onward) have a smaller standard deviation than the non-degassed samples (0-90 min). In addition, the measurement experiences a small disturbance when the flow rate is changed at constant mixing ratio set point (seen at 10-15 min). if the flow rate is kept constant, the mixing unit can provide a uniform mixing quality, as seen in flat lines at each new set point.

When the mixing ratios are changed, the inline IR is able to immediately detect both large and small changes—in mixing ratio. Even changes of 0.5-0.25% in resin content can be detected (70-80 min).

Maximal observed standard deviation of 0.4 indicates that the combined mixing+metering accuracy falls within +/−1.2 weight % of resin content.

This record clearly demonstrates that the change of mixing ratio Epoxy resin/Curing agent is accurately measured by an IR inline analytical tool.

Example 2

Impact of Mixing Ratio on Thermal Performance

The data in Table 1 show that the mixing ratio has strong impact on glass transition temperature (Tg) of uncured as well as cured formulations. The higher amount of Epoxy resin or a lower amount of Epoxy resin over the prescribed level (54 weight % of Epoxy resin in this example) has an significant effect on the measured Tg of the cured composition.

TABLE 1

Glass transition temperature Tg of uncured and cured formulation

| Composition | | | |
|---|---|---|---|
| Epoxy Resin, wt % | 65 | 54 | 45 |
| Curing Agent, wt % | 35 | 46 | 55 |
| Glass transition of uncured formulation measured by DSC | | | |
| Onset, ° C. | −18 | −14 | −12 |
| Midpoint, ° C. | −16 | −12 | −10 |
| Reaction energy | | | |
| Enthalpy J/g | −540 | −455 | −385 |
| Peak onset, ° C. | 241 | 235 | 233 |
| Peak max, ° C. | 298 | 273 | 270 |
| Glass transition of cured formulation (cure cycle: 2 hours at 190° C.) measured by DSC | | | |
| Onset, ° C. | 147 | 211 | 158 |
| Midpoint, ° C. | 156 | 213 | 166 |

From the example 1 and the FIG. 2 it was recorded that variation of the ratio Epoxy resin/Curing agent can be precisely monitored in line by the variation of an IR Signal. The variation measured can induce the opening of a valve to eliminate the mixed composition into a waste tank and before a composite part is being made. When the desired ratio is measured, the composition can be directed fill in the molt to produce the composite structure.

We claim:

1. An apparatus for supplying a liquid or molten liquid thermosetting composition comprising
one or more resins and one or more curing agents mixed in a mixing unit before curing in a mold,
an online analytical tool comprising an analytical method to measure inline the correct mixing ratio of the one or more resins and the one or more curing agents before and/or after mixing, and
material lines upstream of the mixing unit comprising inline measurement probes installed therein,
wherein the online analytical tool is based on irradiation of the liquid thermosetting composition.

2. The apparatus of claim 1, wherein the analytical method is based on refractive index difference, or UV, or Visible, or Infra-red wavelength.

3. The apparatus of claim 2, wherein the analytical method is based on Infra-red (IR) or Near Infra-red (NIR).

4. The apparatus of claim 1, further comprising a valve after the analytical tool, wherein the valve regulates the thermosetting composition to be injected in a mold or to be directed to a waste drum.

5. The apparatus of claim 1 wherein the analytical method of the analytical tool is modeled to process the thermosetting composition comprising a mixture of epoxy resins, in liquid or molten phase, and at least one curing agent for epoxy resins, in liquid or molten phase to be blended in the mixing unit.

6. The apparatus of claim 1 wherein the analytical method of the analytical tool is modeled to process the liquid thermosetting composition comprising an epoxy resin that is a liquid at room temperature or higher with an epoxy equivalent of 80 to 250 g/equivalent and the curing agent comprises a low viscosity liquid or a solid with a melting point lower than 160°.

7. The apparatus of claim 6 wherein the epoxy resin is a liquid at room temperature or higher and with an epoxy equivalent of 80 to 200 g/equivalent and the curing agent is either a low viscosity liquid or a solid with a melting point lower than 160° C.

8. The apparatus of claim 1 wherein the curing agent comprising amine derivatives in liquid form in the material lines before the mixing unit or acid derivatives in a liquid form in the material lines before the mixing unit.

9. The apparatus of claim 1, wherein the mixing unit comprises a static or dynamic mixing device.

10. The apparatus of claim 1, further comprising a pump and further comprising a reservoir or recycling chain disposed after the mixing device.

* * * * *